United States Patent [19]

Kim et al.

[11] Patent Number: 5,572,263
[45] Date of Patent: Nov. 5, 1996

[54] VIDEO SIGNAL SELECTION CIRCUIT

[75] Inventors: Jae Y. Kim, Songnam; Dong J. Go, Suwon; In S. Kim, Suwon; Sang S. Lee, Suwon, all of Rep. of Korea

[73] Assignee: Samsung Electronics Co., Ltd., Kyungki-Do, Rep. of Korea

[21] Appl. No.: 351,083

[22] Filed: Nov. 30, 1994

[30]     Foreign Application Priority Data

Nov. 30, 1993  [KR]   Rep. of Korea ................. 93-25902

[51] Int. Cl.$^6$ ................................................. H04N 5/268
[52] U.S. Cl. ........................ 348/705; 348/706; 348/722
[58] Field of Search ................................... 348/705, 722,
            348/485, 706; 370/58.1, 62; 455/4.2; 345/1–3;
                H04N 5/268, 7/08, 5/44, 5/46, 5/222, 5/60,
                                                                    5/262

[56]                References Cited

U.S. PATENT DOCUMENTS

| | | | |
|---|---|---|---|
| 3,894,177 | 7/1975 | Howell | 348/722 |
| 4,647,973 | 3/1987 | Deiss | 348/705 |
| 4,764,812 | 8/1988 | Hamley | 348/705 |
| 4,907,085 | 3/1990 | Bingham | 348/722 |
| 5,117,225 | 5/1992 | Wang | 345/2 |
| 5,305,105 | 4/1994 | Heo | 348/485 |
| 5,434,628 | 7/1995 | Spiero et al. | 348/705 |

*Primary Examiner*—John K. Peng
*Assistant Examiner*—Nina N. West
*Attorney, Agent, or Firm*—Sughrue, Mion, Zinn, Macpeak & Seas

[57]              ABSTRACT

A video signal selection circuit capable of reading automatically the connection state of a plurality of video jack ports and selecting only modes corresponding to video ports which presently have a jack connected thereto. This video signal selection circuit includes a predetermined number of video jack ports, a predetermined number of switches respectively connected to the video jack ports and turned on when a corresponding jack is connected to the video jack port, and a micro-processor which registers the fact that the jack is connected to the video jack port by checking whether the corresponding switch is turned on. The micro-processor outputs a control signal so that the selection circuit selects only those ports to which jacks are connected when a mode conversion key is actuated. A switching portion is controlled by the micro-processor's control signal and selects for output only those video signal sources corresponding to the control signals received from the micro-processor.

14 Claims, 2 Drawing Sheets

VIDEO SIGNAL SELECTION CIRCUIT

BACKGROUND OF THE INVENTION

1. Field of the Invention

The present invention relates to a video signal selection circuit, and more particularly, to a video signal selection circuit that can recognize automatically the connection state of a plurality of video jacks and select only those modes which correspond to connected jacks when an audio/video tape apparatus is switched via conversion actuator from one mode to another.

2. Description of the Background Art

Audio/video tape apparatuses, especially televisions (TVs), generally have a plurality of jack ports, whereby the number of ports varies with the sophistication of the particular model. Generally, jacks can be provided for any of the following signal sources: radio frequency (RF), video 1, video 2, video 3 and super video (S-VHS).

FIG. 1 is a block diagram depicting a conventional sensing circuit for a video jack block. This circuit includes a key input portion 101 having ten number keys and a mode conversion key (e.g. TV/video conversion key), a micro-processor 102 and a switching portion 103. The micro-processor 102 is programmed to control a TV and regulate a plurality of video modes so that they are convened sequentially by actuating the mode conversion key of the key input portion 101. The switching portion 103 selects an appropriate source of the TV by switching a corresponding jack port and an output terminal of the jack block 104 according to the control of the micro-processor 102.

The kinds of video jacks provided vary according to the model of the TV, i.e. the higher the grade of the TV, usually, the larger the number of video jacks. Hence, the video modes controlled by the mode conversion key are set up by means of option diodes, as shown in the following Table 1.

TABLE 1

| Diode 1 | Diode 2 | Video Loop |
| --- | --- | --- |
| 0 | 0 | TV → VIDEO |
| 0 | 1 | TV → VIDEO 1 → VIDEO 2 |
| 1 | 0 | TV → VIDEO 1 → VIDEO 2 → S-VHS |
| 1 | 1 | Only TV |

For example, if the state of diodes 1 and 2 is set to 10, then there are three jack ports provided in the video device. At this point, assume that only the jack port corresponding to video 1 is connected with a jack, and that jack ports for video 2 and super video are not connected to jacks. If the present mode is the video 1 mode and the mode conversion key of the key input portion 101 is actuated, the micro-processor 102 simply proceeds to the next port in the sequence and controls the switching portion 103 to select the video 2 mode. If the mode conversion key is pressed again, the super video mode is selected.

Thus, if the current mode to be selected is the TV mode, then the mode conversion key must be pressed three times from the video 1 mode. Since the jack ports for video 2 and super video are not connected to a jack, there is no signal input at these ports, and a black or blue screen is displayed.

In the conventional sensing circuit described above and depicted in FIG. 1, if the mode conversion key is pressed, even the modes not used are selected at their point in the sequence. This results in inconvenience to the user, who must press the mode conversion key several times to select the mode he or she wants.

In a related technological development, Japanese Unexamined Publication No. 92-235478 (published on Aug. 24, 1992) and entitled "External Input Selection Circuit", discloses an art that yields substantial reductions in cost by means of circuitry capable of selecting from among a plurality of external inputs without the need for a plurality of synchronous signal detection circuits.

If a user employs this circuitry to convert from a television mode to an external input mode conversion, the conversion circuitry commences a sweep of the tuning voltage, and the various external inputs are sequentially selected according to the change of this tuning voltage.

If a vertical synchronous signal is detected from one of the selected external inputs, the sweep of the tuning voltage terminates, such that selection of that external input is maintained. Therefore, vertical synchronization signal detection circuitry need detect only those external inputs selected by the conversion circuit, and there is no need to install a vertical synchronous signal detecting circuit for each of the plurality of external inputs, which results in reduction in cost.

However, it is possible that even an external input that is not connected to an external source may be selected at the time of selecting external inputs.

SUMMARY OF THE INVENTION

In order to solve the above-mentioned problems, the present invention provides a video signal selection circuit capable of perceiving automatically the connection state of a plurality of video jack ports by means of a micro-processor. The micro-processor selects only those modes which correspond to ports presently connected to a jack, in accordance with selection by a mode conversion key.

In accordance with the present invention, a video signal selection circuit comprises: a predetermined number of video jack ports; a predetermined number of switches respectively connected to the video jack ports and turned on when a corresponding jack is connected to the video jack port; a micro-processor perceiving whether the jack is connected to the video jack port by registering if its corresponding switch is turned on, and outputting a control signal so that only video signals from jacks connected to ports are selected; and a switching portion for selecting and outputting the video signal in accordance with the control signal from the micro-processor.

DETAILED DESCRIPTION OF THE PREFERRED EMBODIMENTS

The present invention will be now described in detail with reference to FIG. 2 of the attached drawings.

Figure 1:
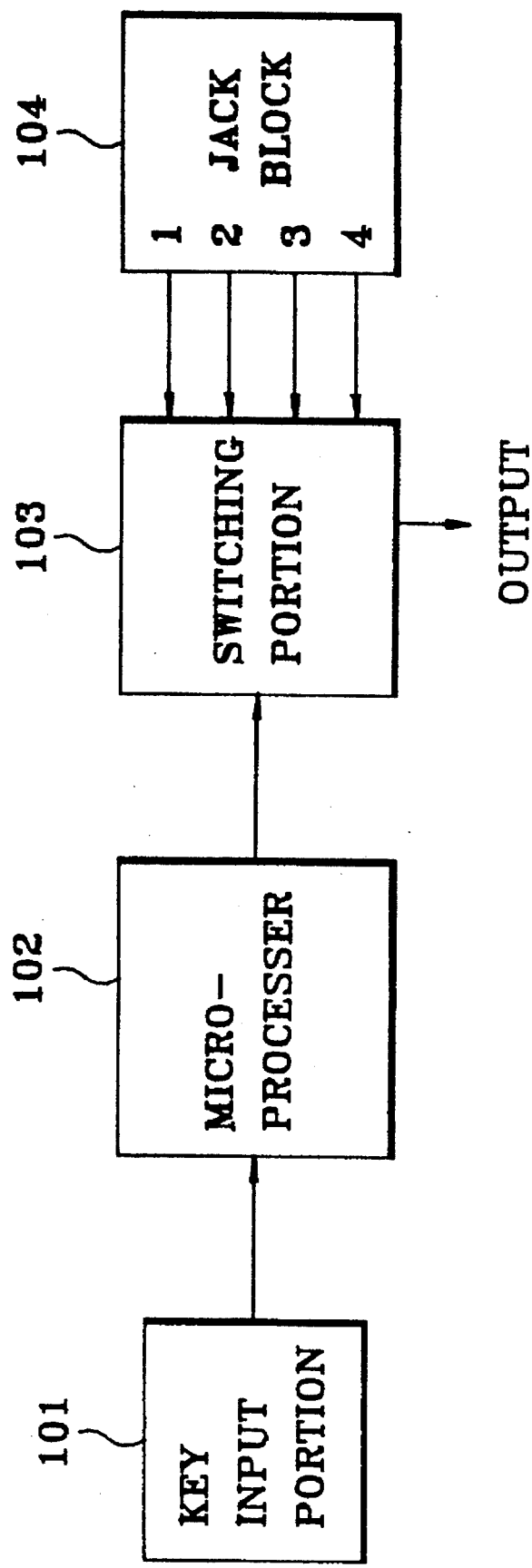
FIG. 1 is a block diagram showing a conventional video signal selection circuit.
Figure 2:
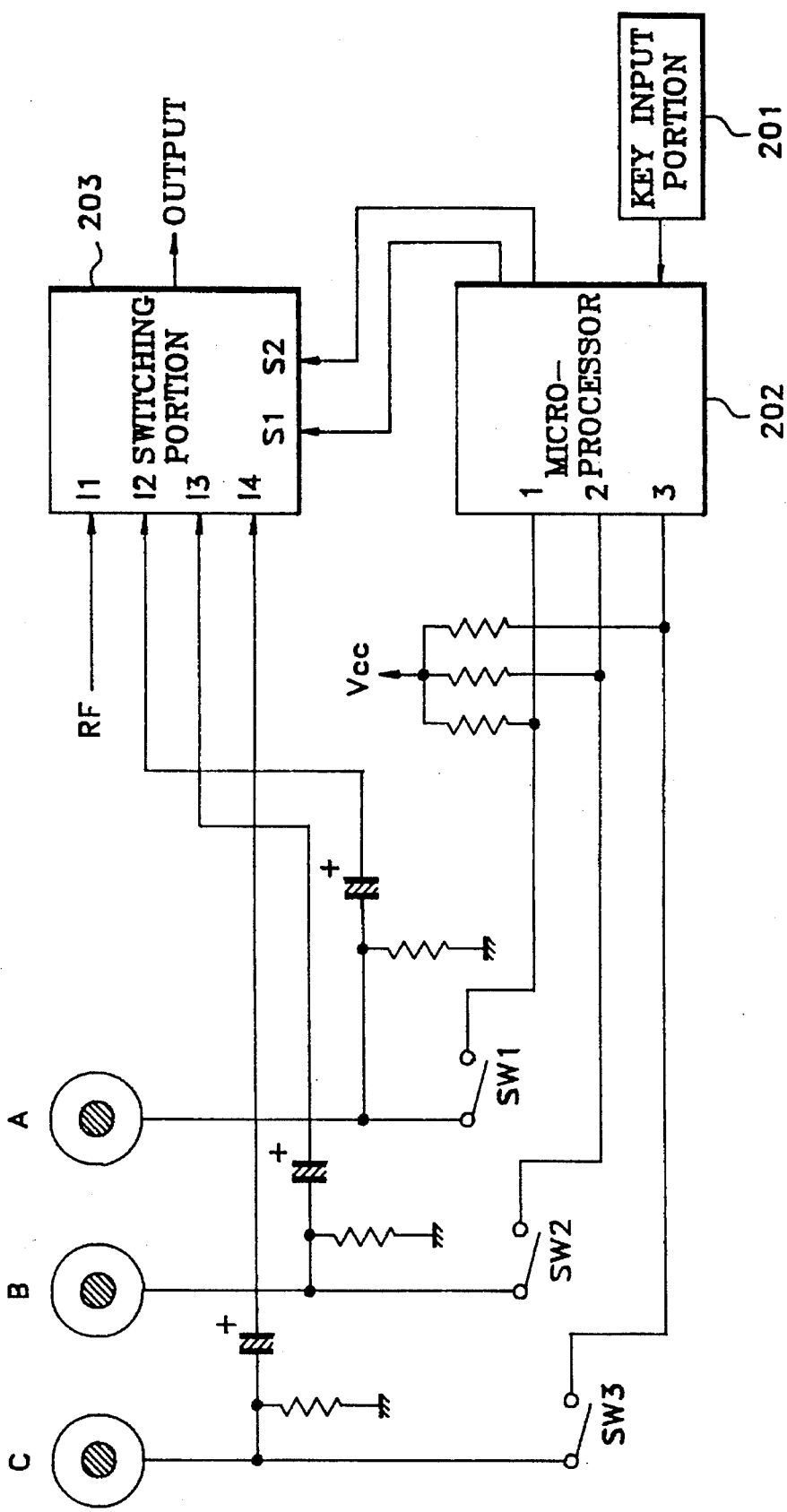
FIG. 2 is a block diagram showing a video signal selection circuit in accordance with the present invention.

FIG. 2 depicts a block diagram showing a video signal selection circuit in accordance with the present invention. There are, e.g., three video jack ports A, B and C, each of which is connected to a respective input port 1, 2 and 3 of a micro-processor 202. The micro-processor 202 reads the connection state of the jacks through each of switches SW1, SW2 and SW3 and outputs control signals accordingly.

If each video jack port is connected with a corresponding jack, the switches SW1, SW2 and SW3 are each turned on and cause a logic low signal to be input to the micro-processor 202. If one or more of the video jack ports is not connected to a corresponding jack, the appropriate switch SW1, SW2 or SW3 is turned off, resulting in a logic high signal being input to the micro-processor 202.

The switching portion 203 has input terminals I1 to I4 connected to a radio frequency (RF) signal line and to signal lines originating at the video jack ports A, B and C. The switching portion 203 selects from among the input terminals I1 to I4 based on the control signals from the micro-processor 202 supplied to its selection terminals S1, S2 and outputs the signal carried by the signal line of the selected terminal.

The switching portion 203 may be fashioned from a multiplexer. A key input portion 201 includes a key panel and a remote control attached to its body, ten number keys, and a mode conversion key (e.g. TV/video key).

According to the invention, if the video jack port A is connected to a video jack A, the first switch SW1 is turned on, and a logic low signal is then input to the first input port 1 of the micro-processor 202. Similarly, if the video jack port B is connected to a video jack B, the second switch SW2 is turned on, and a logic low signal is input to the second input port 2 of the micro-processor 202. The same applies to video jack port C.

According to one possible embodiment of the invention, if signals 00, 01, 10, or 11 are used as inputs to the selection terminals S1, S2 of the switching portion 203, the switching portion 203 selects from among the available ones of the RF signal, video signal A, video signal B, or video signal C, and then outputs the signal actually selected through its output terminal. According to this embodiment, the control signals correspond to the input terminals as follows.

TABLE 2

| S1 | S2 | Input Terminal |
|----|----|----|
| 0  | 0  | I1 (RF) |
| 0  | 1  | I2 (A) |
| 1  | 0  | I3 (B) |
| 1  | 1  | I4 (C) |

If only the video jack ports A and C are connected to corresponding jacks, low signals are input only to the first and third input ports 1 and 3, while a logic high signal is input to the second port 2.

Accordingly, if the mode conversion key is actuated via the key input portion 201 while the mode presently selected is the TV mode, and the micro-processor 202 outputs the signal 01 to the selection terminals S1, S2, the switching portion 203 selects a signal of the video jack A and outputs it through its output terminal.

If the mode conversion key of the key input portion 201 is again actuated, the micro-processor 202 outputs the signal 11 to the selection terminals S1, S2 of the switching portion 203, and the switching portion 203 selects a signal of the video jack C and then outputs it to the output terminal.

And if the mode conversion key is actuated again, the micro-processor 202 outputs the signal 00 to the selection terminals S1, S2 of the switching portion 203, such that the switching portion 203 selects the radio frequency (RF) signal input terminal I1, and then outputs the RF signal.

Accordingly, the switching portion 203 selects according to the progression RF signal—video signal A—video signal C—RF signal, etc. and outputs the selected signal according to the input of the mode conversion key.

If a given video device has only video jack port C connected to a video jack C, the micro-processor 202 controls the switching portion 203 to select and output signals in the progression RF signal—video signal C—RF signal, etc.

In a case where none of the video jack ports A, B, C is connected to a video jack A, B, C, the device may be configured to inform the user, e.g., by means of an on-screen display function, that there is no source connected to the device, or, alternatively, all the video jack ports may simply be selected when the mode conversion key is input.

If a video jack is taken out from its video jack port between or during operation, the switch connected to that video jack port is turned off, which is immediately registered by the micro-processor 202. Thus, if the mode conversion key is subsequently actuated, the input terminal for the disconnected video jack is excluded from the switching progression of the switching portion 203. As such, the user's selection options are limited to the video signals from sources connected to the switching portion 203.

In the present embodiment, each input port 1, 2, 3 of the micro-processor 202 is designed with an active state corresponding to a logic low level. Therefore, if the input port is read as being low, it is understood that a jack is connected to that video jack port. However, the circuitry may also be designed such that each input port 1, 2, 3 of the micro-processor registers an active state with a logic high level.

If in the case of a television, a stereo-video is connected as a source, an RCA jack is used, which requires video V, audio right R and audio left L, and a jack having a switch may be required to accommodate all three.

The case where a monovideo is one of the sources is the same as the above. The present invention may also be applied to a jack for a standard super video, provided a switch is installed in the jack.

By using a video signal selection circuit according to this invention, the present connection state of the video jacks is automatically read by means of the micro-processor, and only those video signals corresponding to jacks actually connected to the jack block: are incorporated into the mode selection cycle. As a result, every time when the mode conversion key of the key input portion is actuated, the circuitry passes directly from one available source to another, without selecting non-available sources.

Accordingly, since sources to which no jacks are connected are not selected, use of the video device is rendered more efficient and convenient since ineffective depressions of the mode conversion key are eliminated.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A video signal selection circuit, comprising:
    a predetermined number of video jack ports;
    a predetermined number of switching means, each respectively connected to an associated one of said video jack ports and being switched when a jack is connected to said associated video jack port;

a micro-processing means, perceiving whether the jack is connected to said associated video jack port by determining if said respective switching means is switched, and outputting a corresponding control signal so that only a video signal from the connected jack is selected by said micro-processor for output.

2. A video signal selection circuit according to claim 1, wherein a switching portion provided between said video jack ports and said micro-processor comprises a multiplexer having input terminals connected respectively to a predetermined number of said video jack ports and having selection terminals connected to a control terminal of said microprocessor for outputting the control signal.

3. A video signal selection circuit according to claim 1, further comprising at least one audio jack port.

4. A video signal selection circuit comprising:

a plurality of video signal input terminals, each said terminal connected to a respective video signal input line;

a plurality of switches, each said switch connected to a respective one of the video signal input lines, and each said switch being set in a first state if the respective video signal input line is connected to a video source and being set in a second state if the respective video signal input line is not connected to a video source;

a processor having a plurality of inputs and at least one output, each said input connected to a respective one of said switches for detecting the state of said respective switch, and said at least one output configured to control each of said video signal input terminals in accordance with the state detected for each said respective switch.

5. The video signal selection circuit according to claim 4, wherein said plurality of video signal input terminals and at least one input connected to said at least one output of said processor are housed in a multiplexer switching portion.

6. The video signal selection circuit according to claim 4, wherein said processor has a further input, said further input configured to receive a mode conversion signal for switching from one video source to another video source, and wherein a control signal output at said at least one output causes said multiplexer switching portion to switch directly from a first video signal input line connected to a video source to a second video signal input line connected to a video source.

7. A video selection circuit for switching between a plurality of video jack ports in a video playback device, comprising:

a micro-processor provided with a predetermined sequence of switching between the video jack ports;

a detector outputting a first signal state to the microprocessor for each of the video jack ports that is connected to a respective signal source and outputting a second signal state to the micro-processor for each of the video jack ports that is not connected to any signals source;

a key input for inputting a jack port switching signal to said micro-processor; and a video signal switching portion configured to switch between the plurality of video jack ports in response to a control signal output by said micro-processor;

whereby said micro-processor utilizes the predetermined sequence and at least one of the first and second signal states to determine a next video jack port connected to one of the signal sources, and generates the control signal designating the determined next video jack port in response to the jack port switching signal.

8. The video selection circuit according to claim 7, wherein said detector comprises a plurality of switches, each said switch being dedicated to one of the video jack ports.

9. The video selection circuit according to claim 7, wherein said switching portion comprises:

at least one selection terminal for receiving the control signal;

a plurality of input terminals each connected to a respective one of the video jack ports;

an output for outputting the video signal of the determined video jack port; and a multiplexer for selecting one of said input terminals in accordance with the control signal received at said at least one selection terminal.

10. A method of switching between a plurality of video jack ports provided in a video device, whereby video jack ports that are not connected to a signal source are skipped, comprising the steps of:

inputting a mode switching signal into a processor, to switch from a presently selected video jack port to a subsequent video jack port;

for each of the plurality of video jack ports, inputting a connection signal into the processor, the connection signal indicating whether its respective video jack port is connected to a signal source;

generating control signals in the processor in response to the mode switching signal and the respective connection signals; and based on the control signals, switching from the presently selected video jack port to a subsequent video jack port that is connected to a signal source.

11. A method of switching between a plurality of video jack ports provided in a video device, comprising the steps of:

establishing a predetermined sequence of switching between the video jack ports;

determining which of the video jack ports are connected to respective signal sources; and switching from a presently selected video jack port to a subsequent video jack port, by selecting a next video jack port connected to a signal source in accordance with the predetermined sequence.

12. The method according to claim 11, wherein said establishing step is performed by programming the predetermined sequence into a micro-processor.

13. The method according to claim 12, wherein said determining step is performed by supplying a first signal state to the micro-processor for each video jack that is connected to one of the signal sources and supplying a second signal state to the micro-processor for each video jack that is not connected to one of the signal sources.

14. The method according to claim 13, wherein said switching step is performed by inputting a jack switching signal into the micro-processor, utilizing the programmed predetermined sequence and at least one of the first and second signal states to generate a control signal corresponding to the subsequent video jack port, and outputting the control signal to a switching portion configured to switch between the plurality of video jack ports.

\* \* \* \* \*